United States Patent
Weinert et al.

(10) Patent No.: US 6,686,051 B1
(45) Date of Patent: *Feb. 3, 2004

(54) CURED POLYESTERS CONTAINING FLUORINATED SIDE CHAINS

(75) Inventors: Raymond J. Weinert, Macedonia, OH (US); Robert E. Medsker, Hartville, OH (US); Daniel D. Woodland, Munroe Falls, OH (US); Edward N. Kresge, Watchung, NJ (US); Daniel C. Gottschalk, Columbus, MS (US); Joe A. Wright, Tuscaloosa, AL (US)

(73) Assignee: OMNOVA Solutions Inc., Fairlawn, OH (US)

( * ) Notice: Subject to any disclaimer, the term of this patent is extended or adjusted under 35 U.S.C. 154(b) by 57 days.

This patent is subject to a terminal disclaimer.

(21) Appl. No.: 09/698,554

(22) Filed: Oct. 27, 2000

Related U.S. Application Data

(63) Continuation-in-part of application No. 09/384,464, filed on Aug. 27, 1999, now Pat. No. 6,383,651, which is a continuation-in-part of application No. 09/244,711, filed on Feb. 4, 1999, now Pat. No. 6,423,418, which is a continuation-in-part of application No. 09/035,595, filed on Mar. 5, 1998, now abandoned.

(51) Int. Cl.⁷ .......................... B32B 15/08; B32B 23/08; B32B 27/08; B32B 27/26; B32B 27/36
(52) U.S. Cl. ...................... 428/458; 428/482; 428/483; 525/437; 525/438; 525/441; 525/443; 525/444; 525/444.5; 528/299; 528/300; 528/308; 528/402
(58) Field of Search ................. 428/458, 482, 428/483, 421, 422; 528/299, 300, 402, 308; 525/437, 438, 441, 443, 444, 444.5

(56) References Cited

U.S. PATENT DOCUMENTS

| | | |
|---|---|---|
| 3,100,722 A | 8/1963 | Hermann et al. |
| 3,834,823 A | 9/1974 | Seregely et al. |
| 3,922,457 A | 11/1975 | Barnwell et al. |
| 3,949,132 A | 4/1976 | Seregely et al. |
| 4,051,195 A | 9/1977 | McWhorter |
| 4,118,541 A | 10/1978 | Power et al. |
| 4,521,571 A | 6/1985 | Ishido et al. |
| 4,603,074 A | 7/1986 | Pate et al. |
| 4,686,275 A | 8/1987 | Bryant et al. |
| 4,746,576 A | 5/1988 | Ozu et al. |
| 4,857,396 A | 8/1989 | Otonari et al. |
| 4,898,981 A | 2/1990 | Falk et al. |
| 4,946,992 A | 8/1990 | Falk et al. |
| 4,988,123 A | 1/1991 | Lin et al. |
| 4,988,797 A | 1/1991 | Wardle et al. |
| 5,025,052 A | 6/1991 | Crater et al. |
| 5,043,221 A | 8/1991 | Koleske |
| 5,045,624 A | 9/1991 | Falk et al. |
| 5,097,048 A | 3/1992 | Falk et al. |
| 5,099,026 A | 3/1992 | Crater et al. |
| 5,166,230 A | 11/1992 | Stecker |
| 5,166,288 A | 11/1992 | Kanai et al. |
| 5,206,066 A | 4/1993 | Horacek |
| 5,210,179 A | 5/1993 | Stewart |
| 5,230,954 A | 7/1993 | Sakamoto et al. |
| 5,302,462 A | 4/1994 | Shah et al. |
| 5,324,764 A | 6/1994 | Fujita et al. |
| 5,361,164 A | 11/1994 | Steliga |
| 5,468,841 A | 11/1995 | Malik et al. |
| 5,476,721 A | 12/1995 | Simeone et al. |
| 5,543,200 A | 8/1996 | Hargis et al. |
| 5,576,095 A | 11/1996 | Ueda et al. |
| 5,637,657 A | 6/1997 | Anton |
| 5,637,772 A | 6/1997 | Malik et al. |
| 5,639,539 A | 6/1997 | DeProspero et al. |
| 5,641,853 A | 6/1997 | Drysdale |
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik |

(List continued on next page.)

FOREIGN PATENT DOCUMENTS

| | | |
|---|---|---|
| EP | 0 348 350 | 12/1989 |
| EP | 348 350 | 12/1989 |
| WO | WO 96/18699 | 6/1996 |
| WO | WO 96/23828 | 8/1996 |
| WO | WO 99/26992 | 6/1999 |
| WO | WO 99/45079 | 9/1999 |
| WO | WO 00/46270 | 8/2000 |

OTHER PUBLICATIONS 10 pages of World Patent Index search results based on PVC and fluoro . . . coating.

(List continued on next page.)

*Primary Examiner*—Vivian Chen
(74) *Attorney, Agent, or Firm*—Daniel J. Hudak; David G. Burleson

(57) ABSTRACT

A polyester polymer includes at least one hydroxyl terminated polyoxetane block containing repeat units derived from polymerizing at least one oxetane monomer having a pendant $—CH_2—O—(CH_2)_n—Rf$ group wherein said Rf group is partially or fully fluorinated. A preferred process for forming said polymer is by reacting a hydroxyl terminated polyoxetane with a polycarboxylic acid under appropriate conditions to form an ester linkage and then adding and reacting that product with polyester forming reactants. The polyester polymer containing at least one polyoxetane block therein when reacted with an amino resin curative can be used as a coating on a substrate wherein the coating has dry erase properties. The coated substrate can be used as prepared or applied to yet other substrates.

43 Claims, No Drawings

U.S. PATENT DOCUMENTS

| | | | |
|---|---|---|---|
| 5,668,251 A | | 9/1997 | Malik et al. |
| 5,672,651 A | | 9/1997 | Smith |
| 5,674,951 A | | 10/1997 | Hargis et al. |
| 5,681,890 A | | 10/1997 | Tanaka et al. |
| 5,703,194 A | | 12/1997 | Malik et al. |
| 5,798,402 A | | 8/1998 | Fitzgerald et al. |
| 5,807,977 A | | 9/1998 | Malik et al. |
| 5,898,046 A | | 4/1999 | Raiford et al. |
| 6,033,737 A | | 3/2000 | Johnson et al. |
| 6,037,483 A | | 3/2000 | Malik et al. |
| 6,040,419 A | | 3/2000 | Drysdale et al. |
| 6,168,866 B1 | | 1/2001 | Clark |
| 6,180,243 B1 | | 1/2001 | Johnson et al. |
| 6,380,351 B1 | * | 4/2002 | Malik et al. ............ 528/402 |
| 6,383,651 B1 | * | 5/2002 | Weinert et al. ............ 428/480 |
| 6,417,314 B1 | * | 7/2002 | Malik et al. ............ 528/60 |
| 6,423,418 B1 | * | 7/2002 | Callicott et al. ............ 428/458 |
| 6,448,368 B1 | | 9/2002 | Malik et al. |
| 2001/0051280 A1 | * | 12/2001 | Callicott et al. ............ 428/483 |

OTHER PUBLICATIONS 4 pages of World Patent Index search results based on PVC and polyester coating.

40 pages of Chemical Abstract search results based on PVC and fluoro . . . coating.

25 pages of Chemical Abstract search results based on PVC and polyester.

Invoice to Southwest Texas Distributions, Inc. dated Apr. 9, 1998 from GenCorp.

CA entries and Derwent patent family printouts on JP 03275859; JP 04363370; JP 07004064; JP 07039812; JP 08283654; JP 6216941; and JP 63248827.

Letter to Southwest Texas Distributions, Inc. dated Mar. 5, 1998 to Greg Nernes from Barry Bastion, Product Manager, GenCorp.

\* cited by examiner

CURED POLYESTERS CONTAINING FLUORINATED SIDE CHAINS

This application is a continuation-in-part of prior application Ser. No. 09/384,464, filed Aug. 27, 1999, entitled POLYESTER WITH PARTIALLY FLUORINATED SIDE CHAINS, now U.S. Pat. No. 6,383,651, granted May 7, 2002, which in turn is a continuation-in-part of prior application Ser. No. 09/244,711, filed Feb. 4, 1999, entitled EASILY CLEANABLE POLYMER LAMINATES, now U.S. Pat. No. 6,423,418, granted Jul. 23, 2002, which in turn is a continuation in part of prior application Ser. No. 09/035,595, filed Mar. 05, 1998, entitled EASILY CLEANABLE POLYMER LAMINATES, now abandoned, all three of which are herein incorporated by reference.

FIELD OF INVENTION

This invention relates to laminates having improved cleanable stain resistance due to the incorporation of a polymer having repeat units from an oxetane monomer having pendant fluorinated groups into a stain resistant surface layer. The stain resistant layer can also be adhered to a variety of substrates including vinyl, polyesters, paper, polyolefins etc. The coatings can exhibit dry erase characteristics when dry erase markers are used. That is, the coating can be marked, but readily removed, (wiped dry) by a dry cloth, erasure, or the like.

More specifically, this invention relates polyester polymers including blocks of polyoxetane derived from polymerizing monomer or monomers including oxetane monomers with partially or fully fluorinated side chains. These polyesters have many of the desirable properties of fluorinated polymers and the ease of processability of the polyesters. The desirable properties of the fluorinated polymers are due to the fluorinated side chains and the tendency of the fluorinated side chains to be disproportionately present at the air-substrate interface. The polyester polymers containing one or more fluorinated polyoxetane or oxirane blocks are cured with an amino resin.

BACKGROUND OF INVENTION

U.S. Pat. No. 4,603,074 sets forth a polyester-amino resin composition that can form a stain resistant layer on plasticized polyvinyl chloride substrates. While this coating was very good with respect to stain resistance and abrasion resistance, it would be desirable to have further increases in cleanability, stain resistance, repellency, and some abrasion resistance.

A variety of polymeric coatings and surface treatments for natural and synthetic materials have been developed to enhance the dirt and stain release characteristics. Some of the more effective ones to date allow for reapplication of the anti-soil treatment after cleaning (such as with carpets) or in tents.

Dry erase boards and ink or marker pens are popular replacements for chalkboards. A variety of relatively non-porous writing surfaces have been developed along with special dry erase markers that are specially designed to leave strong well defined continuous marks that can be erased with a dry cloth or eraser. U.S. Pat. Nos. 3,834,823; 3,922,457; 3,949,132; 4,746,576; 4,988,123 and 5,324,764; disclose such technology and are herein incorporated by reference for their teachings on dry erase systems.

U.S. Pat. No. 5,650,483 describes the preparation of oxetane monomers useful to form oxetane polymers with pendant fluorinated chains. The oxetane polymers were characterized as having low surface energy, high hydrophobicity, oleophobicity and a low coefficient of friction. That patent is incorporated by reference herein for its teachings on how to prepare the oxetane monomers and polymers. In the reference the oxetane polymers could be formulated with isocyanates to form crosslinked compositions. Additional patents issued on variations of the oxetane monomers and polymers. These were U.S. Pat. No. 5,468,841; 5,654,450; 5,663,289; 5,668,250, and 5,668,251 also incorporated herein by reference.

SUMMARY OF INVENTION

According to the present invention, it was discovered that an amino resin cured polyester resin having low surface energy, high hydrophobicity and a low coefficient of friction, which can result in improved stain and abrasion resistance, was developed by incorporating a hydroxyl terminated polymer containing repeat units from an oxetane monomer, having pendant fluorinated groups thereon, into a polyester. The oxetane polymer can be a copolymer and have other repeat units such as derived from the ring opening polymerization of cyclic ethers including tetrahydrofuran, propylene oxide or epoxy (oxirane) monomers. A preferred method of incorporating the polyoxetane polymer or copolymer into the polyester is to react the polyoxetane with a dicarboxylic acid or anhydride thereof under effective conditions to result in a half ester linkage between the polyoxetane and the diacid along with carboxylic acid terminal groups. Thereafter additional polyester repeating units can be added by reacting, for example, in situ, the terminal carboxylic acid groups with at least one polyol or cyclic ether and at least one additional polyacid and/or anhydrides of a polyacid. As polyesters are known to undergo ester interchange reactions one could generically list the reactants used to form the polyesters as polyesters and their precursors.

The preferred oxetane monomer for this application is one with a single pendant $-CH_2-O-(CH_2)_n-Rf$ group where the Rf group is a partially or fully fluorinated linear, saturated or unsaturated, or branched alkyl of from 1 to 20 carbon atoms, and n is from 1 to 3 or 5. Polyoxetanes with two pendant partially fluorinated groups per repeating unit could also be used with this technology. The terminology "partially fluorinated pendant group" will be used to describe the $-CH_2-O-(CH_2)_n-Rf$ group which is only partially fluorinated due to the $CH_2$ and $-(CH_2)_n$ portions, that is, not every carbon atom contains the maximum number of fluorine atoms, or the carbon atom(s) is unsaturated.

One preferred embodiment is a layer of a flexible vinyl chloride polymer coated with said polyester-amino resin composition in solvent and heated to cure and adhere the resin to the vinyl chloride polymer layer with removal of the carrier, solvent or water. This provides the flexible vinyl chloride polymer layer or other substrate with a coating, e.g. dry erase which is stain resistant or which can readily be cleaned to remove stains without significant abrasion.

The vinyl chloride layer may be a vinyl chloride polymer, which is a plastisol coated and fused or is a plasticized vinyl chloride polymer composition which has been calendered or extruded. The vinyl chloride may be applied to a backing, substrate or support. In either case the polyvinyl chloride layer (about 1 to 30 or 100 mils thick) can be printed one or more times. The printed layer can be embossed, before and/or after printing, and finally coated with a layer of a solution of a said polyester-amino resin composition and cured to provide the vinyl chloride polymer layer with an outer stain resistant layer about 0.1 to 2 or 4 mils or more thick.

DISCUSSION OF DETAILS AND PREFERRED EMBODIMENTS

The reactive polyester-amino resin composition may be applied to a substrate (e.g. vinyl chloride polymer, polyester, cellulosic, polyolefin composition) directly (i.e. no intermediate layer) or with an intermediate tie layer to form for example, a dry erase coating. The substrate may be with or without a backing, with or without the printing, with or without decoration, and with or without embossing.

A preferred embodiment relates to the catalyzed reactive polyester-amino resin solution being directly applied to a substrate such as a polyvinylchloride plasticized polymer, polyester, etc., and subsequently cured and used as a dry erase coating surface layer.

The polyester resins are generally made by a condensation polymerization reaction, usually with heat in the presence of a catalyst, of a mixture of at least one polycarboxylic acid or its anhydride and a polyhydric alcohol. Reaction temperature generally range from about 110 to about 275, and desirably from about 215 to about 250° C. with suitable catalysts being such compound as dibutyl tin oxide and the like. Preferred polycarboxylic acids are the dicarboxylic acids and their anhydrides. Fatty monobasic oils or fatty acids, monohydroxy alcohols and anhydrides may be present. The polyester may contain active hydrogen atoms, e.g., carboxylic acid groups and/or hydroxyl groups for reaction with the amino resin or may contain unsaturation for crosslinking by another mechanism such as copolymerization with ethylenically unsaturated monomers. Examples of some acids to use to form the alkyd resin or reactive polyester are adipic acid, cyclohexane dioic acid, azelaic acid, sebacic acid, terephthalic acid, isophthalic acid, phthalic anhydride, and so forth. Generally the aliphatic carboxylic acids have from about 3 to about 10 carbon atoms. Other carboxylic acids such as carbonic acid or phosgene may be used in lieu of carboxylic acids under appropriate conditions. The aromatic carboxylic acids generally have from about 8 or 10 to about 25 or 30 carbon atoms. The polyhydric alcohols (polyols) generally have from about 2 to about 20 carbon atoms and from about 2 to about 5 hydroxyl groups. Polymeric polyols such as formed from the polymerization of cyclic alkylene oxides may be used as a portion or all of the polyhydric alcohol. Polymeric polyols generally have number average molecular weights from 100 to 5,000 or 10,000. Examples of some polyhydric alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Mixtures of the polyols and polycarboxylic acids can be used. An example of a suitable reactive polyester is the condensation product of trimethylol propane, 2,2-dimethyl-1,3-propanediol, 1,4-cyclohexanedimethanol, isophthalic acid, and adipic acid. Mixtures of these reactive polyesters (alkyd resins) can be used. Alkyd resins are well known as shown by the "Encyclopedia of Polymer Science and Technology," Vol. 1, 1964, John Wiley & Sons, Inc., pages 663–734; "Alkyd Resins," Martens, Reinhold Publishing Corporation, New York, 1961 and "Alkyd Resin Technology," Patton, Interscience Publishers, a division of John Wiley and Sons, New York, 1962. Some unsaturated polycarboxylic acids and unsaturated polyols may be used in the condensation reaction.

The polyester segments of the polyester may also be polymerized from cyclic ethers typically containing 2 or 3 or 4 carbon atoms in the ring and an anhydride (e.g. an unsaturated anhydride) using double metal complex cyanide catalysts. These polyesters can be used with a carboxylic half ester functionalized polyoxetane because of the occurrence of ester interchange reactions whereby polyester polymers cleave to form carboxylic acid and hydroxyl end groups and then couple with other polyester fragments via an ester linkage. Generally any cyclic oxide can be utilized such as 1,2-epoxides, oxetanes, and the like, with the cyclic ether having a total of up to 18 carbons atoms, as for example 2 carbon atoms in the ring and up to 16 carbon atoms in the side chains. Such cyclic oxide monomers can also contain one or more aliphatic double bonds. Generally five-member unsaturated cyclic anhydrides are preferred, especially those having a molecular weight between 98 and 400. Mixed anhydrides can be used. Anhydrides include phthalic, itaconic, nadic etc. Halogenated anhydrides can also be used. Such polyesters are known to the art and described in U.S. Pat. No. 3,538,043 which is hereby incorporated by reference.

The number average molecular weight of the polyester polymer or block, whether preformed, or formed in situ, is desirably from about 100 to about 5,000 or 20,000. It is understood that in all these reactions, the possibility exists that some of the polyester molecules will not include any polyoxetane.

Amino resins can be used as a crosslinker (curative) for the polyester when it has terminal hydroxyl and/or carboxylic acid groups. These amino resins generally include alkylated benzoguanamine-formaldehyde, alkylated urea-formaldehyde, or preferably alkylated melamine-formaldehyde resin. Mixtures of these resins can be used. These amino resins are well known and include those set forth in "Aminoplastics," Vale et al, Iliffe Books Ltd., London, 1964; "Amino Resins," Blair, Reinhold Publishing Corporation, New York, 1959, "Modern Plastics Encyclopedia 1980–1981," pages 15, 16 and 25 and "Encyclopedia of Polymer Science And Technology," John Wiley & Sons, Inc., Vol. 2, 1965, pages 1 to 94.

If amino resins are used as curatives (crosslinkers) sufficient amounts by weight of the reactive polyester and amino resin are employed to provide a stain resistant, good durability and flexibility and good adhesion to a substrate if used in a laminate coating. These materials are desirably cured at temperatures of at least 150, 200, 250 or 400° F. or more (66, 93, 121, or 204° C.) for effective times in the presence of a minor amount by weight of an acidic catalyst such as boric acid, phosphoric acid, acid sulfates, hydrochlorides, phthalic anhydride or acid, oxalic acid or its ammonium salts, sodium or barium ethyl sulfates, aliphatic or aromatic sulfonic acids such as p-toluene sulfonic acid (preferred), methane sulfonic acid and the like. It is important that the stain resistance imparted by the polyester and amino resin containing repeat units derived from an oxetane monomer having pendant fluorinated groups be optimized by controlling things such as glass transition temperature, crosslink density and the presence of molecules that may act as plasticizers or other molecules that may transport or attract staining molecules in the coating. Prior to curing flattening agents or other additives can be added to the mixture of the reactive polyester and amino resin.

The hydroxyl terminated polymer(s) including repeat units from an oxetane having a pendant —$CH_2$—O—$(CH_2)_n$—Rf group are prepared from the polymerization of oxetane monomer with fluorinated side chains. These polyoxetanes can be prepared in a manner as set forth herein below, and also according to the teachings of U.S. Pat. Nos. 5,650,483; 5,668,250; 5,688,251; and 5,663,289, hereby fully incorporated by reference. The oxetane monomer desirably has the structure

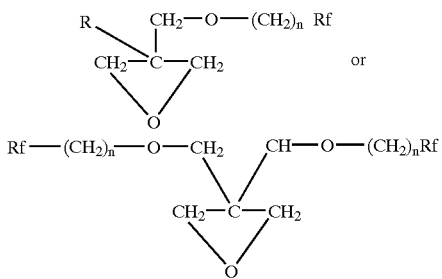

wherein n is an integer from 1 to about 3 or about 5 and Rf, independently, on each monomer is a linear or branched, unsaturated, or preferably saturated alkyl group of 1 to about 20 carbon atoms with a minimum of 25, 50, 75, 85, or 95, or preferably perfluorinated i.e. 100 percent of the H atoms of said Rf being replaced by F, and optionally up to all of the remaining H atoms being replaced by I, Cl or Br, with Cl being preferred; or each Rf, independently, being an oxaperfluorinated polyether having from about 4 to about 60 carbon atoms; R being H or an alkyl of 1 to 6 carbon atoms.

The repeating units from said oxetane monomers desirably have the structure

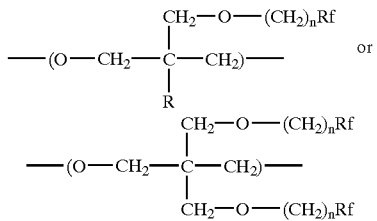

where n, Rf, and R are as described above.

The hydroxyl terminated polymer(s) including repeat units from said oxetane monomers can have one or more terminal hydroxyl groups. They desirably have number average molecular weights from about 100, 250, 500, 1,000 or 5,000 to about 50,000 or 100,000. The polymer(s) can be a homopolymer or a copolymer of two or more different oxetane monomers. The polymer may also be a copolymer including non-fluorinated cyclic ether molecules or repeat groups thereof having from 2 to 4 carbon atoms in the ring such as tetrahydrofuran and one or more oxetane monomers as described in at least the previously incorporated U.S. Pat. No. 5,668,250. The copolymer may also include copolymerizable substituted cyclic ethers such as substituted tetrahydrofuran. The repeat unit from a tetrahydrofuran monomer has the formula —(O—CH$_2$—CH$_2$—CH$_2$—CH$_2$—). In some embodiments, said hydroxyl terminated copolymer includes up to 10, 20 or 30 wt % of said tetramer based on the weight of said hydroxyl terminated polymer(s) although amounts of up to 50, 70, or 90 wt % can be utilized.

It is desirable that the polymer including repeat units from an oxetane having one or two pendant —CH$_2$—O—(CH$_2$)$_n$—Rf group has one or more terminal hydroxyl groups in that this provides a possible mechanism for this polymer to be chemically bound into the polyester. The relative amount of bound and fugitive partially fluorinated polyoxetane has not been measured in some prior polyester compositions and the bound portion may be a small or large percentage of the total oxetane repeating units.

It is desirable to prereact, endcap, the hydroxyl terminated fluorinated polyoxetane oligomer, polymer, or copolymer, (polyoxetane block) with the polycarboxylic acid or anhydride thereof for ease of incorporation of the fluorinated moiety into a polyester via an ester linkage. This route increases the rate of incorporation, and in some cases the percentage of fluorinated polyoxetane that is incorporated into the polyester or other polymer. Subsequent thereto, the polyester block can be formed. A preferred route to form the ester linkage is to react the hydroxyl terminated partially fluorinated polyoxetane with at least 2 moles of a carboxylic acid from a polycarboxylic acid having from 3 to 10 or 30 carbon atoms such as malonic acid, or succinic acid, or glutaric acid, or adipic acid, or pimelic acid, or maleic acid, or fumaric acid, or cyclohexane dioic acid, and the like, an anhydride, thereof, per equivalent of hydroxyl groups from any polyol component under conditions effective to form an ester condensation product from the hydroxyl group of the polyoxetane and the carboxylic acid group of the polycarboxylic acid or its anhydride. More desirably, the equivalents of carboxylic acid groups is at least 2.05 or 2.1 equivalents. The reaction temperature is generally from about 110 to about 275° C. and desirably from about 215 to about 250° C. In a preferred embodiment, the amount of non-fluorinated polyol is small or zero to force the carboxylic acid groups to react with the hydroxyl group of the partially fluorinated polyoxetane. Desirably, the equivalents of hydroxyls from non-fluorinated polyols are less than 0.5, more desirably less than 0.2 and preferably less than 0.1 per equivalent of hydroxyls from the partially fluorinated polyoxetane until after at least 70, 80, 90, or 95 mole percent of the hydroxyl groups of the polyoxetane are converted to half esters with the polycarboxylic acid. It is also acknowledged that the percentage of the polymer with said oxetane repeating units and the oxetane repeating units themselves may not be uniformly distributed through the bulk of the polyester. Said oxetane repeating units are usually disproportionately present at the surface of the coating due to the low surface tension of those repeat units. The amount of surface fluorine groups can be determined by XPS (x-ray photoelectron spectroscopy).

As previously noted, the polyester resins are made by a condensation polymerization reaction in the presence of heat and usually a catalyst with the above noted polycarboxylic acids or anhydrides thereof and the above noted polyols. The polyester compositions of the present invention can be formed by reacting the ester forming monomers in the presence of a derivative of the above noted fluorinated polyoxetane oligomer, polymer, or copolymer which contains an ester linkage derived from the reaction of a polycarboxylic acid or anhydride with the fluorooxetane. Alternatively, a preformed polyester can be formed which is then reacted with the fluorinated polyoxetane oligomer, polymer, or copolymer containing the noted ester linkage. In other words, the polyester can be formed or derived or polymerized in the presence of the polyfluorooxetane derivative or it can be initially polymerized and subsequently reacted as through a hydroxyl end group with a polyoxetane having the ester linkage thereon.

While not as desirable, an alternative route is to react the hydroxyl terminated fluorinated polyoxetane oligomer, polymer, or copolymer (polyoxetane block copolymer) directly with either the polyester forming monomers or the preformed polyester as set forth hereinabove to form a polyester composition containing repeat units therein derived from the polyoxetane oligomer, polymer, or copolymer. That is, instead of derivativizing the fluorooxetane (forming a preformed ester linkage), the polyester monomers are allowed to react with themselves and also directly with a polyoxetane polyol to bond the same to the polyester being polymerized. Thus, the polyester can either be formed in-situ by polymerizing ester forming monomers in the presence of said polyoxetane, or it can be produced by the reaction of the polyoxetane with a preformed polyester with or without other monomers.

The various ester forming monomers such as the polycarboxylic acids, the polyols, as well as the various reaction conditions, and the like are generally the same as set forth hereinabove.

The amount of fluorinated polyoxetanes in said polyester is desirably from about 0.05 or 0.1 or 0.2 to about 10, 15 or 50 weight percent based on the weight of the polyester including the polyoxetane portion. The polyester can be diluted with other components (including non-fluorinated polyesters) while preparing a coating or other polymer composition. The repeating units from a polyester are desirably from about 50 to about 99.8 weight percent of the polyester and more desirably from about 85 or 90 to about 99 weight percent. The amount of the oxetane repeat units having a pendant $CH_2$—O—$(CH_2)_n$Rf group is desirably from about 0.1 or 0.2 to about 10 or 15 parts by weight and more desirably from about 0.5 to about 10 or 15 parts by weight per 100 parts total weight of the final coating or molded article from these polyesters. Of course if the hydroxyl terminated polymer(s) including repeat units from said oxetane has a significant amount of comonomer repeat units from tetrahydrofuran or other repeating unit therein, the hydroxyl terminated polyoxetanes weight will exceed that of said oxetane repeating units as noted immediately above.

Additionally other conventional additives may be formulated into the polyester-amino composition for particular applications. Examples include viscosity modifiers, antioxidants, antiozonants, processing aids, pigments, fillers, ultraviolet light absorbers, adhesion promoters, emulsifiers, dispersants, solvents, crosslinking agents, etc.

The amount of the various components in the coating will be generally specified in relationship to 100 parts by weight of the polyester resin and the amino resin crosslinking agent. The weight ratio of polyester resin (neat) to amino resin (neat) can vary widely but desirably is from about 10:90 to 90:10 and more desirably from about 20:80 to 80:20; or 70:30 to 30:70, or 60:40 to 40:60. Generally, it is more desirable to match the moles of reactive groups on the polyester to within 10 to 20% to the number of moles of reactive groups on the amino resin. The number of moles of reactive groups can be determined by dividing the weight of the component by the equivalent weight for the component. The term "neat" after polyester and amino resin does not exclude using polyesters and amino resins that are received dissolved in solvents or dispersed in water but rather specifies that the amount used is to be recalculated based on the weight without the solvent. For the purposes of this disclosure no distinction will be made whether the amino resin crosslinks the polyester resin or vice versa.

The amount of carriers and/or solvent(s) in the coating composition can vary widely depending on the coating viscosity desired for application purposes, and solubility of the components in the solvent. The solvent(s) can be any conventional solvent for polyester-amino resin systems. These carriers and/or solvents include but are not limited to water, alkyl alcohols of 1 to 10 carbon atoms, ketones of from 3 to 15 carbon atoms e.g. methyl ethyl ketone or methyl isobutyl ketone, alkylene glycols and/or alkylene glycol alkyl ethers having from 3 to 20 carbon atoms, acetates and their derivatives, ethylene carbonate, etc. Illustrative U.S. patents of the carrier and/or solvent systems available include U.S. Pat. Nos. 4,603,074; 4,478,907; 4,888,381 and 5,374,691 hereby incorporated by reference for their teachings both of carriers and/or solvent systems and of polyesters and amino resins. While most acetate type solvents can be used, e.g. n-butyl acetate, a preferred solvent is n-propyl acetate. The amount of solvent(s) can desirably vary from about 20 parts by weight to about 400 parts by weight per 100 parts by weight of total polyester resin and amino resin.

The amount of catalyst is an amount that effectively catalyzes the mutual crosslinking of the polyester and amino resins under the crosslinking conditions chosen (usually elevated temperatures). As the crosslinking temperature increases above 150, 200, 250 or 400° F. (66, 93, 121 or 204° C.) the amount of catalyst can be reduced. Effective amounts of catalyst can vary from about 0.1, 0.5 or 1 to about 6 or 8 parts by weight and preferably from about 2 or 3 to about 6 parts by weight per 100 parts by weight total of said polyester and amino resins.

Conventional flattening agents can be used in the coating composition in conventional amounts to control the gloss of the coating surface to an acceptable value. Examples of conventional flattening agents include the various waxes, silicas, aluminum oxide, alpha silica carbide, etc. Amounts desirably vary from about 0 to 0.1 to about 5 or 10 parts by weight per 100 parts by weight total of said polyester and amino resins. For most embodiments high gloss is preferred.

While this disclosure generally teaches applying the coating which can serve as a dry-erase coating directly to a substrate, it also provides for intermediate coating(s) between the substrate and the coating. These intermediate coating(s) can be known decorative coatings to provide a colored background or a printed (patterned) background. Decorative coatings include designs, flowers, figures, graphs, maps, etc. Alternatively or additionally, they can be a buffer between the substrate and the dry-erase coating preventing interaction between the dry-erase coating and the substrate. Or they can prevent interaction between components in the substrate and components in the dry-erase coating (e.g. keeping the plasticizer contained within the substrate from migrating into the coating). An intermediate coating(s) may also function to improve adhesion of the coating to the substrate when adhesion is a concern. An example where adhesion might be improved is with a polyolefin (polyethylene or polypropylene) substrate which may be plasma or corona surface treated or have an intermediate primer or adhesive layer applied thereto before the dry-erase coating is applied. The intermediate layer can be various polymers, or copolymers, or blends thereof, such as an acrylic, a blend of an acrylic and polytvinyl chloride), a copolymer of poly(vinyl chloride) and vinyl acetate, and the like.

The polyester amino resin may be used in any traditional polyester application including as a molding material or a coating material. When used as a coating material the substrates may be any material, which would benefit from a low surface energy, hydrophobic properties including stain resistance or dry-erase, cleanability, and low coefficient of friction. Examples of substrates that can be coated with coating compositions derived from these polyesters include cellulosic products (coated and uncoated paper, boardstock, cardboard, wood and paneling); fibers; synthetic polymers (including polyolefins, polyesters, polycarbonates, polystyrene, poly (methacrylates) and especially highly filled or highly plasticized ones which are more porous towards stains e.g. polyvinyl chloride); metals (requiring temporary or permanent protection from stains or corrosion); and ceramics.

The polyesters of this application are useful as components in molding resins, components in coating, etc where low surface tension and/or low coefficient of friction is desired. The amount of partially fluorinated oxetane repeating units can be controlled by varying their content in the polyoxetane or by varying the amount of polyester components. The polyesters can include hydrophobic or hydrophilic (or polar and/or nonpolar) moieties to vary the compatibility of the polyester with other components. The polyester can be used as a thermoplastic resin or reacted into thermoset compositions (e.g. thermoset polyester-amine, polyurethane, or epoxy).

The above-noted polyester polyoxetane-amine compositions of the present invention are particularly useful in preparing highly cleanable stain resistant surfaces such as dry erase writing surfaces (including boards, posters, papers, clipboards, menus, etc.) wallcoverings, and in kitchens and food preparation areas. Stain resistant laminates from these polyesters, can be used in the manufacture of tablecloths, shoe uppers, luggage exteriors, upholstery, vehicle interiors and seats, golf bags and other sporting goods and so forth.

When polyvinyl chloride is utilized as a substrate, it can be an emulsion (plastisol grade) or a suspension grade vinyl chloride polymer. The vinyl chloride polymer can be polyvinyl chloride homopolymer (preferred) or a copolymer of a major amount by weight of repeat units from vinyl chloride and a minor amount by weight from a copolymerizable monomer selected from the group consisting of vinyl acetate, vinylidene chloride and maleic ester. Bulk and solution vinyl chloride polymers, also may be used. Mixtures of vinyl chloride polymers can be used. Vinyl chloride polymers and copolymers are well known and include those set forth in "*Vinyl and Related Polymers*," Schildknecht, John Wiley & Sons, Inc., New York, 1952; Sarvetnick, "*Polyvinyl Chloride*," Van Nostrand Reinhold Company, New York 1969; Sarvetnick, "*Plastisols and Organosols*," Van Nostrand Reinhold Company, New York, 1972 and "*Modern Plastics Encyclopedia* 1980–1981," October, 1980, Volume 57, No. 10A, McGraw-Hill Inc., New York.

The amount of plasticizer used to plasticize the vinyl chloride polymer to make it flexible may vary from about 20 or 30 to about 100 parts by weight per 100 parts by weight of total vinyl chloride polymer resin more desirably from about 20 or 30 to about 50 or 60 parts by weight for wallpaper applications and from about 60 to about 100 parts by weight for upholstery type applications per 100 parts by weight of total polyvinyl chloride. Any conventional plasticizer for PVC can be used. Examples of plasticizers which may be used are butyl octyl phthalate, dioctyl phthalate, hexyl decyl phthalate, dihexyl phthalate, diisooctyl phthalate, dicapryl adipate, dioctyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate and so forth. Mixtures of plasticizers may be used.

Other vinyl chloride polymer compounding ingredients are desirably incorporated in the vinyl chloride polymer compositions. Examples of such ingredients are the silicas such as precipitated silica, fumed colloidal silica, calcium silicate and the like, calcium carbonate, ultra violet light absorbers, fungicides, carbon black, barytes, barium-cadmium-zinc stabilizers, barium-cadmium stabilizers, tin stabilizers, dibasic lead phosphite, $Sb_2O_3$, zinc borate, molybdates such as ammonium octa-molybdates, aluminum oxide, aluminum trihydrate and so forth and mixtures of the same. $TiO_2$, red iron oxide, phthalocyanine blue or green or other color pigments can be used. The pigments and the other dry additives preferably are dispersed or dissolved in one or more plasticizers before adding to the plasticized vinyl chloride polymer compositions. These compounding ingredients are used in effective amounts by weight to control color, mildew, stabilization to ultraviolet light and heat, viscosity and so forth of the plasticized vinyl chloride polymer.

The vinyl chloride polymer composition may contain suitable blowing or foaming agents such as sodium bicarbonate, and the organic agents like 1,1-azobisformamide, 4,4-oxybis (benzene sulfonylhydrazide), p-toluenesulfonyl hydrazide, or water and so forth to form a cellular or foamed vinyl chloride polymer composition layer or sheet on fusing. The blowing agents may require an activator. Such blowing agents are well known.

Vinyl chloride polymer blending or extender resins, also, can be used in the compositions in a minor amount by weight as compared to the vinyl chloride polymer composition.

The ingredients forming the vinyl chloride polymer composition may be charged to and mixed together in any one of several mixing devices such as a Ross Planetary mixer, a Henschel mixer, Hobart dough type mixer, Banbury, 2-roll rubber mill, Nauta mixer and ribbon blender and so forth.

The vinyl chloride polymer composition can be formed into layers of films which can be unsupported or supported (preferred). Where a vinyl chloride polymer plastisol composition is used, it may be cast on a release surface and heated to fuse it to form a film. Where a plasticized suspension grade vinyl chloride polymer composition is used, it can be calendered or extruded and fused to form a film. Temperatures may vary from about 100 or 200 to about 400° F. (93–204° C). However, it is preferred that in either case the compounded vinyl chloride polymer compositions be supported or have a backing. In the case of the supported vinyl chloride polymer composition, the substrate can be a woven fabric (drill, scrim, cheesecloth, and so forth), a knit fabric, a non-woven fabric, paper etc. The fabric can be continuous, discontinuous, woven, nonwoven, bundled etc and made of cotton, cellulose, nylon, polyester, aramid, glass, rayon or acrylic fibers or cords or mixtures of the same. It may be necessary in some instances to treat the fabric with an adhesive coating or dip to adhere or to improve adhesion of the fabric to the vinyl chloride polymer composition.

The vinyl chloride polymer composition film or layer, supported or unsupported, is preferably printed on the surface with a suitable vinyl chloride polymer receptive ink to form desirable and novel pattern and/or design. Such inks are well known and can be applied by various methods of printing such as by gravure, flexography, screen printing, jet printing, web printing, non-impact printing and so forth as for example, set forth in "Modern Plastics Encyclopedia 1980–1981," pages 464–465. The printing operation may be repeated for up to five times or more to vary the colors and designs at temperatures of desirably from about 150 to about 165° F. (66–74° C.) for each printing step.

The vinyl chloride polymer composition film or layer, supported or unsupported, printed or unprinted, decorated, can be smooth or embossed to texture the vinyl chloride layer to provide a pattern or design for esthetic or functional purposes. Embossing of thermoplastic films, layers or sheets is well known and is usually carried out by passing the film between an embossing roll and a backup roll under controlled preheating and post-cooling conditions. See "Modern Plastics Encyclopedia 1980–1981," pages 454–45. Additional decorating or printing can sometimes be done with the above stated inks over the smooth or embossed vinyl chloride polymer surface for better aesthetic purposes.

The following examples will serve to illustrate the present invention with more particularity to those skilled in the art.

Preparation of Mono and Bis(Fluorooxetane) Monomers

Various fluorinated oxetane monomers can be made in accordance with U.S. Pat. Nos. 5,650,483; 5,668,250; 5,668,251; and 5,663,289; which have been fully incorporated by reference. While the following representative examples relate to the preparation of specific FOX (fluorooxetane) monomers, (i.e. mono 3-FOX, mono 7-FOX, and bis 6-FOX) other mono or bis FOX monomers can be prepared in a very similar manner.

EXAMPLE M1

Preparation of 3-FOX Monomer 3-(2,2,2-Trifluoroethoxymethyl)-3-Methyloxetane

Synthesis of the 3-FOX oxetane monomer is performed as follows:

A dispersion of 50 weight percent (2.8 grams, 58.3 mmol) sodium hydride in mineral oil, was washed twice with hexanes and suspended in 35 milliliters of dimethyl formamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethyl formamide was added and the mixture was heated at 75°–85° C. for 20 hours, when $^1$H MNR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, brine, dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90 percent. The oil was distilled at 30° C. and 0.2 millimeters mercury pressure to give 4.3 grams of analytically pure 3-FOX, corresponding to a 60 percent yield. The analyses of the product were as follows: IR (KBr) 2960–2880, 1360–1080, 990, 840 cm$^{-1}$; $^1$H NMR δ 1.33 (s, 3H), 3.65 (s, 2H), 3.86 (q, J=8.8 Hz, 2 H), 4.35 (d, J=5.6 Hz, 2 H), 4.51 (d, J=5.6 Hz, 2 H); $^{13}$C NMR δ 20.72, 39.74, 68.38 (q, J=40 Hz), 77.63, 79.41, 124 (q, J=272 Hz). The calculated elemental analysis for $C_7 H_{11}F_3O_2$ is: C=45.65; H=6.02; F=30.95. The experimental analysis found: C=45.28; H=5.83; F=30.59.

EXAMPLE M2

Preparation of 7-FOX Using PTC Process 3-(2,2,3,3,4,4,4-Heptafluorobutoxymethyl)-3-Methyloxetane A 2 L, 3 necked round bottom flask fitted with a reflux condenser, a mechanical stirrer, a digital thermometer and an addition funnel was charged with 3-bromomethyl-3-methyloxetane (351.5 g, 2.13 mol), heptafluorobutan-1-ol (426.7 g, 2.13 mol), tetrabutylammonium bromide (34.4 g) and water (85 ml). The mixture was stirred and heated to 75° C. Next, a solution of potassium hydroxide (158 g, 87% pure, 2.45 mol) in water (200 ml) was added and the mixture was stirred vigorously at 80°–85° C. for 4 hours. The progress of the reaction was monitored by GLC and when GLC analysis revealed that the starting materials were consumed, the heat was removed and the mixture was cooled to room temperature. The reaction mixture was diluted with water and the organic layer was separated and washed with water, dried and filtered to give 566 g (94%) of crude product. The crude product was transferred to a distillation flask fitted with a 6 inch column and distilled as follows:

Fraction #1, boiling between 20° C.–23° C./10 mm-Hg, was found to be a mixture of heptafluorobutanol and other low boiling impurities, was discarded;

Fraction #2, boiling between 23° C. and 75° C./1 mm-Hg, was found to be a mixture of heptafluorobutanol and 7-FOX, was also discarded; and Fraction #3, boiling at 75° C./1 mm-Hg was >99% pure 7-FOX representing an overall yield of 80.2%

NMR and GLC data revealed that 7-FOX produced by this method was identical to 7-FOX prepared using the sodium hydride/DMF process.

Example M3 relates to the preparation and properties of 3,3-bis(2,2,2-trifluoroethoyxmethyl)oxetane (B3-FOX).

EXAMPLE M3

Sodium hydride (50% dispersion in mineral oil, 18.4 g, 0.383 mol) was washed with hexanes (2×) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2×). The combined organic extracts were washed with brine, 2% aqueous HCl, water, dried (MgSO4), and evaporated to give 17.5 g (100%) of 3,3-bis-(2,2,2-trifluoroethoxymethyl) oxetane as an oil containing DMF (<1%). The oil was purified by bulb-to-bulb distillation at 42–48° C. (10.1 mm) to give 15.6 g (79%) of analytically pure B3-FOX, colorless oil: IR (KBr) 2960–2880, 1360–1080, 995, 840 cm$^{-1}$; $^1$H NMR δ 3.87 (s 4H), 3.87 (q,J=8.8 Hz, 4H), 4,46 (s, 4H); $^{13}$C NMR δ 43.69, 68.62 (q,J=35 Hz), 73.15, 75.59, 123.87 (q,J=275 Hz); $^{19}$F NMR δ −74.6(s). Anal. Calcd, for $C_9H_{12}F_6O_3$; C,38.31; H, 4.29; F, 40.40. Found: C, 38.30; H, 4.30; F, 40.19.

Preparation of oligomers, polymers or copolymers from the fluorinated oxetane monomers described herein can be made in accordance with U.S. Pat. Nos. 5,650,483; 5,668,250; 5,668251; or 5,663,289; hereby fully incorporated by reference.

EXAMPLE A

An Example of Preparing a Poly-FOX-THF Copolymer is as Follows

A 10 L jacketed reaction vessel with a condenser, thermocouple probe, and a mechanical stirrer was charged with anhydrous methylene chloride (2.8 L), and 1,4-butanediol (101.5 g, 1.13 moles). $BF_3$THF (47.96 g, 0.343 moles) was then added, and the mixture was stirred for 10 minutes. A solution of 3-Fox, 3-(2,2,2-trifluoroethoxyl-methyl)-3- methyloxetane, made in accordance with U.S. Pat. Nos. 5,650,483; 5,668,250; 5,663,289; or 5,668251, (3,896 g. 21.17 moles) in anhydrous methylene chloride (1.5 L) was then pumped into the vessel over 5 hours. The reaction temperature was maintained between 38 and 42° C. throughout the addition. The mixture was then stirred at reflux for an additional 2 hours, after which $^1$H NMR indicated >98% conversion. The reaction was quenched with 10% aqueous sodium bicarbonate (1 L), and the organic phase was washed with 3% aq. HCl (4 L) and with water (4 L). The organic phase was dried over sodium sulfate, filtered, and stripped of solvent under reduced pressure to give 3,646 g (91.2%) of title glycol, a clear oil. NMR: The degree of polymerization (DP) as determined by TFAA analysis was 15.2 which translates to an equivalent weight of 2804. The THF content of this glycol, as determined by 1 H NMR, was 2.5% wt THF (6.2% mole THF). This example was included to teach how to polymerize partially fluorinated oxetane polymers. These and similar examples were utilized to form dry erase coatings.

EXAMPLE I (FOX COPOLYMERS)

Two different hydroxyl terminated fluorinated polyoxetanes were used to prepare four different polyester materials according to this invention in a manner as set forth above in Example A. The first polyoxetane had 6 mole % repeating units from tetrahydrofuran (THF) with the rest of the polymer being initiator fragment and repeating units from 3-FOX where n=1, Rf is $CF_3$, and R is $CH_3$. The number average molecular weight of the first polyoxetane was 3400. The second polyoxetane had 26 mole % of its repeating units from tetrahydrofuran with the residual being the initiator fragment and repeating units from 3-FOX. 3-FOX is also known as 3-(2,2,2-trifluoroethoxylmethyl)-3-methyloxetane.

EXAMPLE II (FOX—POLYESTER COPOLYMERS AND COATINGS THEREFROM)

The first and second fluorinated oxetane polymers of Example I were reacted with at least a 2 equivalent excess (generally 2.05–2.10 excess) of adipic acid in a reactor at 455 F. for 3.5 hours to form a polyoxetane having the half ester of adipic acid as end groups. This half ester linkage will serve to chemical bond the polyoxetane to a subsequently in-situ formed polyester. In other words, this polyoxetane has a preformed ester linkage. NMR analysis was used to confirm that substantially all the hydroxyl groups were converted to the ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to 300 F.

The adipic acid functionalized polyoxetane was then reacted with additional diacids and diols to form polyester blocks. The diacids were used in amounts of 24.2 parts by weight of adipic acid and 24.5 parts by weight of isophthalic acid. The diols were used in amounts of 20.5 parts by weight cyclohexanedimethanol, 14.8 parts by weight neopentyl glycol, and 16.0 parts by weight trimethylol propane. The relative amounts of the adipate ester of the oxetane polymer and the polyester forming components was adjusted to result in polyesters with either 2 or 4 weight percent of partially fluorinated oxetane repeating units. The reactants were reacted in the same pot used to react the adipic acid but the reaction temperature was lowered to 420° F. The reaction time was continued until the calculated amount of water was generated. The finished batch sizes were from 20 to 30 gallons.

The four polyesters (2 or 4 wt. % oxetane and 6 or 26 mole percent of the polyoxetane being repeating units from THF) were formulated into solvent based coating compositions as shown in Table 1. The Resimene 747 resin is an amino resin curative (alkylmelamine-formaldehyde) for polyester resins. The PTSA is paratoluene sulfonic acid catalyst (40 Wt. % active in isopropanol). The coating compositions varied in the amount of polyoxetane in the polyester, the amount of tetrahydrofuran repeating units in the polyoxetane, and the weight ratio of Resimene (melamine formaldehyde curative) to polyester. The coating compositions were applied to plasticized polyvinyl chloride substrate in a conventional manner without any intermediate tie coat. The coatings were cured by heating to approximately 240° F. (116° C.) for about one minute.

TABLE I

| Components | Sample 1 | Sample 2 | Sample 3 | Sample 4 | Sample 5 |
|---|---|---|---|---|---|
| n-propyl acetate | 8.3 | 8.3 | 8.3 | 8.3 | 8.5 |
| THF | .925 | 10.9 | 10.9 | 10.9 | 10.9 |
| Polyester having 2 wt. % of 1st oxetane (6 mol % THF) | 18.95 | 0 | 0 | 0 | 16.8 |
| Polyester having 4 wt. % of 1st oxetane(6 mol % THF) | 0 | 0 | 0 | 18.95 | 0 |
| Polyester having 2 wt. % 2$^{nd}$ oxetane(26 mol % THF) | 0 | 18.95 | 0 | 0 | 0 |
| Polyester having 4 wt. % 2$^{nd}$ oxetane(26 mol % THF) | 0 | 0 | 18.95 | 0 | 0 |
| Resimene 747 | 18.55 | 18.55 | 18.55 | 18.55 | 20.15 |
| PTSA | 3.3125 | 3.3125 | 3.3125 | 3.3125 | 3.6 |

| Components | Sample 6 | Sample 7 | Sample 8 | Sample 9 | Sample 10 |
|---|---|---|---|---|---|
| n-propyl acetate | 8.5 | 8.5 | 8.5 | 8.75 | 8.75 |
| THF | 10.9 | 10.9 | 10.9 | 11.0 | 11.0 |
| Polyester having 2 wt. % 1st oxetane(6 mol % THF) | 0 | 0 | 0 | 0 | 0 |
| Polyester having 4 wt. % 1st oxetane (6 mol % THF) | 0 | 0 | 16.8 | 14.6 | 0 |
| Polyester having 2 wt. % 2$^{nd}$ oxetane(26 mol % THF) | 16.8 | 0 | 0 | 0 | 0 |
| Polyester having 4 wt. % 2$^{nd}$ oxetane(26 mol % THF) | 0 | 16.8 | 0 | 0 | 14.6 |
| Resimene 747 | 20.15 | 20.15 | 20.15 | 21.75 | 21.75 |
| PTSA | 3.6 | 3.6 | 3.6 | 3.9 | 3.9 |

The units in the table above are grams.

It should be noted that the technology shown in Table 1 results in high amounts of fluorine on the surface of the coating and the high amounts of fluorine are associated with low surface energy, good abrasion resistance, and easy cleaning. Similar or identical recipes have resulted in 15–18 atomic percent fluorine on the surface as determined by XPS. This is generally a 30–50 percent increase over similar recipes using similar amounts of partially fluorinated polyoxetane but without pre-reaction of the polyoxetane into the polyester, e.g. the following control.

As a control, a coating was utilized containing a copolymer generally having repeat units of an oxetane monomer having the structure

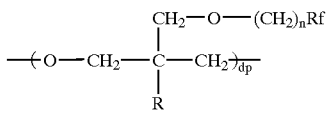

Wherein n was 1, R was CH3, Rf was CF3, and dp was from about 12 to about 18. Comonomer repeat groups were derived from tetrahydrofuran. The amount of the tetrahydrofuran in the copolymer was approximately 2.5% by weight with the remainder being the repeat group derived from said oxetane. The hydroxyl terminated copolymer was blended with a polyester and a melamine formaldehyde and cured to form a cured coating product. The polyester was derived from monomers of trimethylol propane, 2,2-methyl-1,3-propane diol, 1,4-cyclohexanedimethanol, phthalic anhydride, and adipic acid. The amount of said polyester was approximately 60% by weight. The amount of the above-noted polyoxetane copolymer was approximately 2% by weight, and the amount of said melamine formaldehyde curing agent was approximately 40% by weight. The above composition was applied by Gravure coating and cured in an oven at approximately 200° C. for about 1 minute. The coating was formed on a polyvinyl chloride substrate and generally sold as a dry erase product. The above coating was applied to the polyvinyl chloride substrate. However, although suitable results were obtained initially, after a couple of weeks the coating was permanently stained by a standard and conventional dry erase marker, for example an Expo® marker.

While in accordance with the patent statutes the best mode and preferred embodiment have been set forth, the scope of the invention is not limited thereto, but rather by the scope of the attached claims.

What is claimed is:

1. A cured polyester composition, comprising:
   the reaction product of
   (i) at least one polyoxetane chemically bonded via an ester linkage to at least one polyester, said ester linkage being derived from the reaction of a hydroxyl group of said polyoxetane with a carboxylic acid group of a polycarboxylic acid or an anhydride thereof; said polyoxetane having repeat units derived from oxetane monomers having at least one pendant —CH$_2$—O—(CH$_2$)$_n$—Rf group, with each n being, independently, 1 to about 5; and each Rf being, independently, unsaturated, or a linear or branched saturated alkyl group of from 1 to about 20 carbon atoms with a minimum of 25% of the hydrogen atoms of said alkyl group being replaced by F, and optionally up to all of the remaining H atoms being replaced by I, Cl, or Br; and said at least one polyester being derived from an ester condensation reaction of at least one polycarboxylic acid or an anhydride thereof with at least one polyol or at least one cyclic ether, and
   (ii) an amino resin.

2. A cured polyester composition according to claim 1, wherein said at least one polyester has a number average molecular weight of at least 100; wherein said polyoxetane has a number average molecular weight of at least 100, wherein n is 1 to 3, wherein Rf, independently, has a minimum of 50% of the hydrogen atoms replaced by F; wherein said polycarboxylic acid forming said ester linkage is oxalic acid, or malonic acid, or succinic acid, or glutaric acid, or adipic acid, or pimelic acid or, maleic acid, or fumaric acid, or cyclohexane diacid; wherein said polyoxetane is additionally derived from a cyclic ether comonomer having from 2 to about 4 carbon atoms in the ring, and wherein the amount of said comonomer is up to about 90 percent by weight based on the total weight of said comonomer and said oxetane monomer.

3. A cured polyester composition according to claim 1, wherein n is 1 to 3; wherein said amount of said amino resin is from about 10 percent to about 90 percent by weight based upon the total weight of said amino resin and said polyester containing said polyoxetane, wherein said amino resin comprises alkylated benzoguanamine-formaldehyde, alkylated melamine-formaldehyde, alkylated urea-formaldehyde, or combinations thereof; wherein the amount of said polyoxetane is from about 0.1 to about 15 percent by weight based upon the total weight of said polyester and said polyoxetane, wherein said polyoxetane is additionally derived from a cyclic ether comonomer having from 2 to about 4 carbon atoms in the ring in an amount up to about 30 percent by weight based upon the total weight of said comonomer and said oxetane monomer, wherein said polycarboxylic acid or anhydride thereof forming said ester linkage has from 3 to 30 carbon atoms, and wherein said at least one polyester is formed in the presence of said polyoxetane having said ester linkage or wherein said at least one polyester is preformed and reacted with said polyoxetane having said ester linkage.

4. A cured polyester composition according to claim 3, wherein Rf is said saturated alkyl and has a minimum of 75% of said H atoms replaced by F; wherein said one or more polycarboxylic acids or an anhydride thereof from which said polyester is derived contains from 3 to about 30 carbon atoms, wherein said one or more polyols from which said polyester is derived contains from 2 to about 20 carbon atoms, and wherein said polyester is formed in the presence of said polyoxetane having said ester linkage.

5. A cured polyester composition according to claim 4, wherein said polycarboxylic acid from which said polyester is derived is adipic acid and isophthalic acid, and wherein said polyol from which said polyester is derived is 2,2-dimethyl-1,3-propanediol, trimethylol propane, and cyclohexane dimethanol.

6. A cured polyester composition according to claim 5, wherein said cyclic ether is tetrahydrofuran, wherein the amount of said cyclic ether comonomer is up to about 20% by weight based upon the total weight of said comonomer and said oxetane monomer.

7. A cured polyester composition according to claim 6, wherein said carboxylic acid from which said ester linkage is derived is adipic acid, or cyclohexane dioic acid; and wherein said amino resin is said alkylated melamine-formaldehyde.

8. A cured polyester composition according to claim 7, and wherein Rf is perfluoronated.

9. A cured polyester composition according to claim 8, wherein said oxetane monomer has one pendant —CH$_2$—O—(CH$_2$)$_n$—Rf group.

10. A cured polyester composition according to claim 4, wherein said oxetane monomer has one pendant —CH$_2$—O—(CH$_2$)$_n$—Rf group.

11. A cured polyester composition according to claim 1, wherein said oxetane monomer has one pendant —CH$_2$—O—(CH$_2$)$_n$—Rf group.

12. A laminate, comprising:
   a cured dry erase coating on a substrate, said dry erase coating comprising the reaction product of
   (i) at least one polyoxetane chemically bonded via an ester linkage to at least one polyester, said ester linkage of said polyoxetane being derived from the reaction of a hydroxyl group of said polyoxetane with a carboxylic acid group of a polycarboxylic acid or an anhydride thereof; said polyoxetane having repeat units derived from oxetane monomers having at least one pendant —$CH_2$—O—$(CH_2)_n$—Rf group, with each n being, independently, 1 to about 5, and each Rf being, independently, a linear or branched alkyl group of from 1 to about 20 carbon atoms with a minimum of 50% of the hydrogen atoms of said alkyl group being replaced by F, and optionally up to all of the remaining H atoms being replaced by I, Cl, or Br; and said at least one polyester being derived from a reaction of at least one polycarboxylic acid or an anhydride thereof with at least one polyol or at least one cyclic ether, and (ii) an amino resin.

13. A laminate according to claim 12, wherein n is from 1 to 3, wherein said polyoxetane is optionally derived from a cyclic ether comonomer having from 2 to 4 carbon atoms in the ring, wherein the amount of said optional comonomer is up to about 30 percent by weight based on the total weight of said comonomer and said oxetane monomer, and wherein said at least one polyester is formed in the presence of said polyoxetane having said ester linkage or wherein said at least one polyester is preformed and reacted with said polyoxetane having said ester linkage.

14. A laminate according to claim 13, wherein said the amount of said amino resin is from about 10 percent to about 90 percent by weight based upon the total weight of said amino resin and said polyester containing said polyoxetane, wherein said amino resin comprises alkylated benzoguanamine-formaldehyde, alkylated melamine-formaldehyde, alkylated urea-formaldehyde, or combinations thereof; wherein the amount of said polyoxetane is from about 0.1 to about 15 percent by weight based upon the total weight of said polyester and said polyoxetane, and wherein said polyester is formed in the presence of said polyoxetane having said ester linkage.

15. A laminate according to claim 14, wherein said Rf has a minimum of at least 85% with the hydrogen atoms of said alkyl group being replaced by F, wherein said one or more polycarboxylic acids or an anhydride thereof from which said polyester is derived contains from 3 to about 30 carbon atoms, wherein said one or more polyols from which said polyester is derived contains from 2 to 20 carbon atoms; wherein said carboxylic acid from which said ester linkage is derived has from 3 to 30 carbon atoms, and wherein said polyoxetane includes said comonomer and said comonomer is tetrahydrofuran; and wherein Rf is $CF_3$.

16. A laminate according to claim 15, wherein said polycarboxylic acid from which said polyester is derived is adipic acid and isophthalic acid, wherein said polyol from which said polyester is derived is 2,2-dimethyl-1,3-propanediol, trimethylol propane, and cyclohexane dimethanol; wherein said carboxylic acid from which said ester linkage is derived is adipic acid, and wherein said amino resin is said alkylated melamine-formaldehyde.

17. A laminate according to claim 16, wherein said substrate is a cellulosic product, a fiber, a synthetic polymer, a metal, a ceramic, or combinations thereof.

18. The laminate of claim 16, wherein said substrate is polyvinyl chloride.

19. The laminate of claim 16, including an intermediate layer between said coating and said substrate, and wherein said substrate is polyvinyl chloride.

20. The laminate of claim 15, wherein said substrate is polyvinyl chloride.

21. The laminate of claim 15, including an intermediate layer between said coating and said substrate, wherein said substrate is a synthetic polymer.

22. The laminate of claim 15, wherein said substrate has printing or decoration thereon.

23. A laminate according to claim 14, including an intermediate layer between said coating and said substrate.

24. A laminate according to claim 23, wherein said substrate is a cellulosic product, a fiber, a synthetic polymer, a metal, a ceramic, or combinations thereof.

25. A laminate according to claim 14, wherein said substrate is a cellulosic product, a fiber, a synthetic polymer, a metal, a ceramic, or combinations thereof.

26. A laminate according to claim 12, including an intermediate layer between said coating and said substrate.

27. The laminate of claim 26, wherein said intermediate layer or said substrate has printing or decoration thereon.

28. A laminate according to claim 12, wherein said substrate is a cellulosic product, a fiber, a synthetic polymer, a metal, a ceramic, or combinations thereof.

29. The laminate of claim 12, wherein said substrate is a synthetic polymer.

30. The laminate of claim 12, including an intermediate layer between said coating and said substrate, wherein said substrate is a cellulosics product or a synthetic polymer.

31. The laminate of claim 12, wherein said substrate has printing or decoration thereon.

32. A cured polyester composition, comprising:

the reaction product of (i) at least one polyoxetane chemically bonded to at least one polyester, wherein said polyester is preformed and reacted with said polyoxetane, or wherein said polyester is formed in the presence of said polyoxetane, said polyoxetane having repeat units derived from oxetane monomers having at least one pendant —$CH_2$—O—$(CH_2)_n$—Rf group, with each n being, independently, 1 to about 5; and each Rf being, independently, unsaturated, or a linear or branched saturated alkyl group of from 1 to about 20 carbon atoms with a minimum of 25% of the hydrogen atoms of said alkyl group being replaced by F, and optionally up to all of the remaining H atoms being replaced by I, Cl, or Br; and said at least one polyester being derived from an ester condensation reaction of at least one polycarboxylic acid or an anhydride thereof with at least one polyol or at least one cyclic ether, and (ii) an amino resin.

33. A cured polyester composition according to claim 32, wherein said at least one polyester has a number average molecular weight of at least 100, and wherein said polyoxetane has a number average molecular weight of at least 100, and wherein n is 1 to 3, wherein Rf, independently, has a minimum of 50% of the hydrogen atoms replaced by F; wherein said polyoxetane is additionally derived from a cyclic ether comonomer having from 2 to about 4 carbon atoms in the ring, and wherein the amount of said comonomer is up to about 90 percent by weight based on the total weight of said comonomer and said oxetane monomer.

34. A cured polyester composition according to claim 33, wherein said amount of said amino resin is from about 10 percent to about 90 percent by weight based upon the total weight of said amino resin and said polyester containing said polyoxetane, wherein said amino resin comprises alkylated benzoguanamine-formaldehyde, alkylated melamine-formaldehyde, alkylated ureaformaldehyde, or combinations thereof; wherein the amount of said polyoxetane is from about 0.1 to about 15 percent by weight based upon the total weight of said polyester and said polyoxetane, and wherein the amount of said cyclic ether comonomer is up to about 30 percent by weight based upon the total weight of said comonomer and said oxetane monomer.

35. A cured polyester composition according to claim 34, wherein Rf has a minimum of 75% of said H atoms replaced by F; wherein said one or more polycarboxylic acids or an anhydride thereof from which said polyester is derived contains from 3 to about 30 carbon atoms, and wherein said one or more polyols from which said polyester is derived contains from 2 to about 20 carbon atoms.

36. A cured polyester composition according to claim 35, wherein said polycarboxylic acid from which said polyester is derived is adipic acid and isophthalic acid, and wherein said polyol from which said polyester is derived is 2,2-dimethyl-1,3-propanediol, trimethylol propane, and cyclohexane dimethanol.

37. A cured polyester composition according to claim 36, wherein said cyclic ether is tetrahydrofuran, wherein the amount of said cyclic ether comonomer is up to about 20% by weight based upon the total weight of said comonomer and said oxetane monomer, wherein said amino resin is said alkylated melamine-formaldehyde, and wherein Rf is perfluorinated.

38. A cured polyester composition according to claim 37, wherein said polyester is formed in the presence of said polyoxetane.

39. A cured polyester composition according to claim 38, wherein said oxetane monomer has one pendant —$CH_2$—O—$(CH_2)_n$—Rf. group.

40. A cured polyester composition according to claim 34, wherein said polyester is formed in the presence of said polyoxetane.

41. A cured polyester composition according to claim 32, wherein said polyester is formed in the presence of said polyoxetane.

42. A cured polyester composition according to claim 41, wherein said oxetane monomer has one pendant —$CH_2$—O—$(CH_2)_n$—Rf group.

43. A cured polyester composition according to claim 32, wherein said oxetane monomer has one pendant —$CH_2$—O—$(CH_2)_n$—Rf group.

* * * * *